United States Patent [19]
Crick

[11] 3,723,023
[45] Mar. 27, 1973

[54] INDEPENDENT SELF ADJUSTING VIBRATION DAMPER

[75] Inventor: Virlon Crick, Southwick, Mass.

[73] Assignee: The United States of America as represented by the Secretary of the Air Force

[22] Filed: May 5, 1971

[21] Appl. No.: 140,401

[52] U.S. Cl.................................416/219, 416/500
[51] Int. Cl.......................................F01d 5/16
[58] Field of Search.......416/214, 500, 220, 219, 221

[56] References Cited

UNITED STATES PATENTS 3,266,770   8/1966   Harlow.............................416/190 X

FOREIGN PATENTS OR APPLICATIONS 989,556    5/1951   France..................................416/500
1,223,315  1/1960   France..................................416/500
1,263,677  5/1961   France..................................416/500
561,754    4/1957   Italy......................................416/500

Primary Examiner—Everette A. Powell, Jr.
Attorney—Harry A. Herbert, Jr. and Henry S. Miller, Jr.

[57] ABSTRACT

The torque-transmitting connections between a turbine rotor and the individual turbine blades include centrifugally responsive vibration damping elements having limited freedom to swing an individual coupling shafts between plates securing each blade to the rotor assembly. The torque transfer value varies as the speed varies, to damp vibrations due to speed fluctuations.

1 Claim, 2 Drawing Figures

PATENTED MAR 27 1973 3,723,023

INVENTOR.
VIRLON CRICK
BY Harry A. Herbert Jr.
Henry B. Miller Jr. and
ATTORNEYS

INDEPENDENT SELF ADJUSTING VIBRATION DAMPER

BACKGROUND OF THE INVENTION

This invention relates generally to a means for vibration-damping in axial-flow turbomachines and more specifically to a means that is responsive to centrifugal force for minimizing the vibration in turbine blades.

Before this invention, the so called "toggle" dampers for turbine blades were assembled by attachment to the rear blade retaining plate. Each "toggle" damper contacted two adjacent turbine blades at the rear blade platform. This design incorporates certain inherent disadvantages. One disadvantage is damper loading at the rear platform rather than the more desirable uniform damper loads fore and aft along the blade mounting. Another disadvantage in prior art design was an excessive leakage of air caused by "toggle" dampers being mounted from the rear retaining plate. This invention overcomes the disadvantages of known "toggle" dampers.

SUMMARY OF THE INVENTION

The invention consists of a pair of vibration dampers each being generally rectilinear at one end and bifurcated at the other. Each of the pair of vibration dampers are secured to the end of a shaft by an interference fit. The resulting damper assembly is a complete unit, independent of other engine parts or components.

During assembly of the turbine rotor, the damper assembly is trapped fore and aft by blade retaining plates. It is further trapped radially outward by the turbine blade and radially inwardly by the turbine disk. The damper assembly per se is not attached to any of the aforementioned components, rather it is confined to an area defined by these parts.

It is therefore an object of the invention to provide a new and improved turbine blade vibration damper.

It is another object of the invention to provide a new and improved vibration damper for turbine blades that is self adjusting.

It is a further object of the invention to provide a new and improved vibration damper that provides a uniform damper load on the turbine blade.

It is still another object of the invention to provide a new and improved vibration damper that minimizes air leakage from the turbine.

It is still a further object of the invention to provide a new and improved vibration damper that is an independent part of the turbine rotor-blade assembly.

These and other advantages, features and objects of the invention will become more apparent from the following description taken in connection with the illustrative embodiments in the accompanying drawings.

DESCRIPTION OF PREFERRED EMBODIMENT

Figure 1:
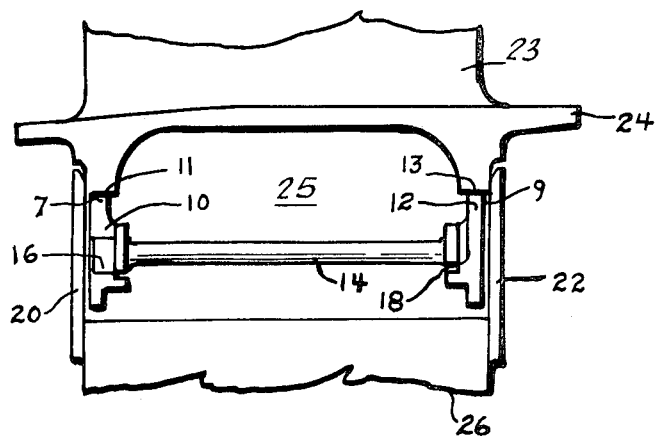
FIG. 1 is a side elevation view of the vibration damper assembly installed on a turbine disk.

Referring now to FIG. 1, the vibration dampers 10 and 12 are secured to a shaft 14 by an interference fit at 16 and 18. The vibration dampers are constructed partially bifurcated at one end and having a pair of contact surfaces 7 and 9 which are designed to contact the blade platforms 11 and 13.

At assembly of the high pressure turbine rotor, the damper assembly (10, 12 and 14) is trapped fore and aft of the rotor's longitudinal axis by the blade retaining plates 20 and 22. The turbine blade consists of a vane 23, platform 24 and shank 25 and is secured to the rotor disk by a conventional dove tail slot means between the shank and disk. Radially outward, the turbine blade base 24 confines the damper assembly and radially inward it is restrained by the turbine disk 26.

Figure 2:
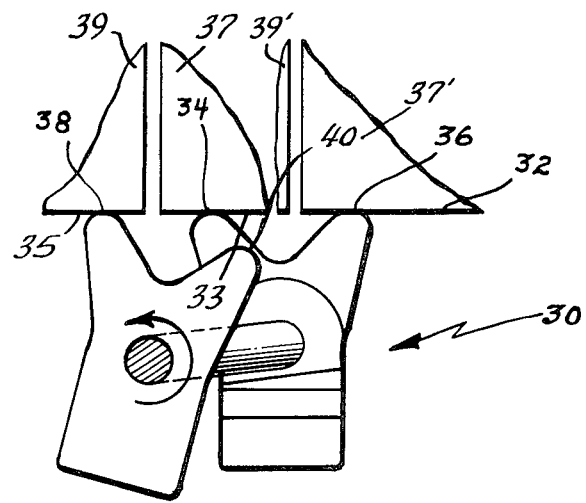
FIG. 2 is an elevational view of the invention.

The described area at the base of each turbine blade contains the damper assembly which is a complete unit, independent of other engine parts. FIG. 2 shows that in operation, as the turbine begins to rotate, the damper assembly 30 is loaded against the blade platforms 32 33 and 35 of the blades 37 and 39 by centrifugal force. Since the damper assembly is self-adjusting the assembly will adjust itself to the vibration of the blade and dampen the blade motion accordingly. For example, if the damper assembly contacts the blade platforms as shown in FIG. 2 at points 34, 36 and 38, the centrifugal force would create a moment about point 38 which would overcome the resistance to turning created by the interference fit and move the assembly unit point 40 contacts the blade platform.

With the adjustment accomplished, friction dampening will then occur at both front and rear dampers by the relative motion of the blades with respect to the dampers.

Having thus described my invention for an independent, self-adjusting vibration damper for turbine blades, the following are my claims of invention.

I claim:

1. A self adjusting vibration dampering system for turbine blades comprising: a shaft; a first and second damper assembly mounted at opposite ends of said shaft and having an interference fit therewith, said assemblies being rectangular on one end and having a plurality of contact surfaces on the opposite end and adapted to contact the base of adjacent turbine blades upon movement of the turbine rotor disk.

* * * * *